(12) United States Patent
Sallinen et al.

(10) Patent No.: US 8,667,554 B2
(45) Date of Patent: Mar. 4, 2014

(54) METHOD AND A DEVICE FOR SUPPLYING A DECODER WITH DATA

(75) Inventors: Sami Sallinen, Espoo (FI); Erik Piehl, Helsinki (FI)

(73) Assignee: Oy Gamecluster Ltd., Espoo (FI)

( * ) Notice: Subject to any disclaimer, the term of this patent is extended or adjusted under 35 U.S.C. 154(b) by 1416 days.

(21) Appl. No.: 11/631,365

(22) PCT Filed: Jul. 1, 2004

(86) PCT No.: PCT/FI2004/000413
§ 371 (c)(1),
(2), (4) Date: Apr. 30, 2008

(87) PCT Pub. No.: WO2006/003233
PCT Pub. Date: Jan. 12, 2006

(65) Prior Publication Data
US 2008/0298467 A1    Dec. 4, 2008

(51) Int. Cl.
*H04N 7/16* (2011.01)
*H04N 11/02* (2006.01)
(52) U.S. Cl.
USPC .. 725/146; 725/151; 375/240.01; 375/240.12
(58) Field of Classification Search
None
See application file for complete search history.

(56) References Cited

U.S. PATENT DOCUMENTS

| 5,521,898 | A | 5/1996 | Ogasawara | |
|---|---|---|---|---|
| 5,652,627 | A * | 7/1997 | Allen | 348/497 |
| 6,377,624 | B1 | 4/2002 | Keesman | |
| 6,546,013 | B1 | 4/2003 | Huang et al. | |
| 6,680,944 | B1 | 1/2004 | Lym et al. | |
| 6,700,893 | B1 * | 3/2004 | Radha et al. | 370/412 |
| 6,741,290 | B1 * | 5/2004 | Wells | 348/512 |
| 6,895,009 | B1 | 5/2005 | Stallkamp | |
| 6,985,188 | B1 | 1/2006 | Hurst, Jr. | |
| 2004/0146211 | A1 | 7/2004 | Knapp et al. | |
| 2005/0078711 | A1 | 4/2005 | Stallkamp | |

FOREIGN PATENT DOCUMENTS

| EP | 0614186 | 9/1994 |
|---|---|---|
| EP | 0643537 | 3/1995 |
| EP | 1 089 569 A1 | 4/2001 |
| EP | 0 713 341 B1 | 5/2002 |
| EP | 1 002 424 B1 | 5/2003 |

(Continued)

OTHER PUBLICATIONS

Japanese Office Action, with English translation, issued in Japanese Patent Application No. 2007-518623, mailed Apr. 20, 2010.

(Continued)

*Primary Examiner* — Chris Parry
(74) *Attorney, Agent, or Firm* — Young & Thompson (57) ABSTRACT

A method and a device for supplying a decoder with data stream such as compressed video signal including both non-predictive and predictive data frames of a common data type. A device comprising a decoder for service data is provided with (1012, 1020) a specific frame that is a predictive frame indicating substantially no changes in the service data in relation to a possible previous service data frame supplied. A service data buffer is monitored (1014) and in case it's at least near an underflow condition according to a number of predetermined criteria (1016), the decoder is fed with the specific frame in order to prevent the decoder from being disturbed due to a lack of timely provided proper input data (1018).

32 Claims, 7 Drawing Sheets

(56) References Cited

FOREIGN PATENT DOCUMENTS

| | | |
|---|---|---|
| EP | 1443770 | 8/2004 |
| GB | 2 328 099 A | 2/1999 |
| JP | 2002-077827 | 3/2002 |
| JP | 2002-218458 | 8/2002 |
| WO | WO 00/64187 | 10/2000 |
| WO | WO 0178408 | 10/2001 |

OTHER PUBLICATIONS

English translation of Korean Office Action issued in Korean Patent Application No. 10-2006-7027976, mailed Apr. 9, 2009.
Chinese Office Action, with English translation, issued in Chinese Patent Application No. 200480043486.1, mailed Apr. 15, 2010.
European Office Action issued in European Patent Application No. EP 04 742 156.5-2223 dated Jan. 20, 2010.

* cited by examiner

PRIOR ART

Figure 5

PRIOR ART

Figure 6

PRIOR ART

METHOD AND A DEVICE FOR SUPPLYING A DECODER WITH DATA

FIELD OF THE INVENTION

The present invention relates generally to communication systems. In particular the invention concerns digital broadband systems such as Digital Video Broadcasting (DVB) technology and video coding applied therein.

BACKGROUND OF THE INVENTION

Digital Video Broadcasting (DVB) term refers to a number of standards defining digital broadcasting techniques that utilize satellite (DVB-S), cable (DVB-C), or terrestrial (DVB-T) distribution media. Such standards cover source coding, channel coding, conditional access (PayTV and related data scrambling solutions), and various other issues. In the early 1990's a specific DVB Project was established by major European public and private sector organizations in the television sector to create a framework for the introduction of MPEG-2 (Moving Picture Experts Group) audio/video compression standard into digital television services. The DVB project has steadily raised its popularity and worldwide adoption thereof is already on hand.

Figure 1:
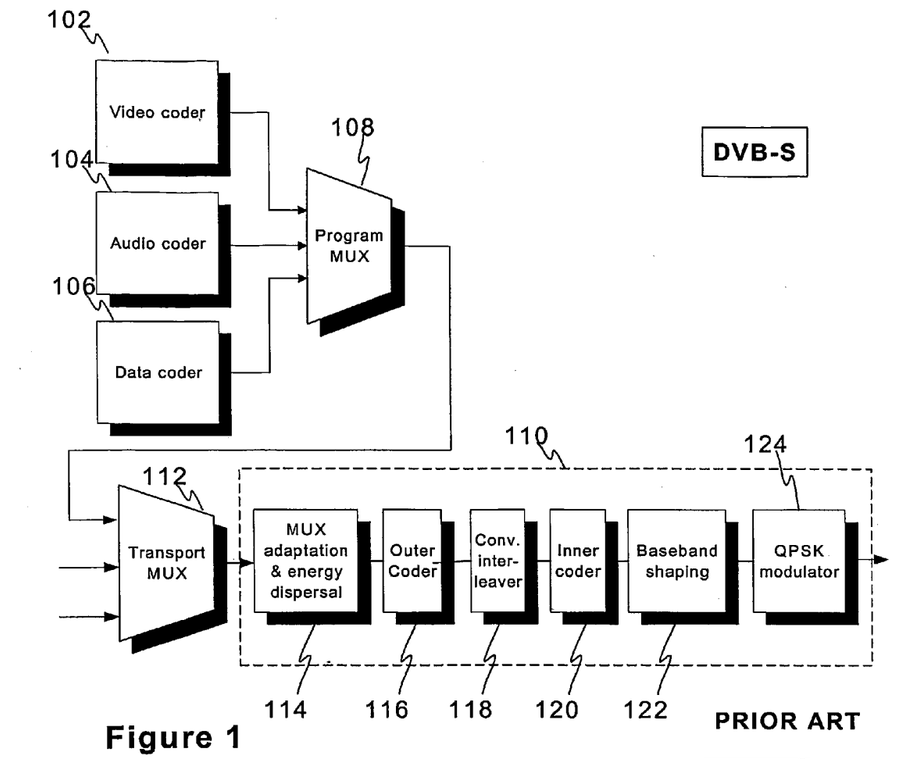
FIG. 1 depicts the DVB transmission system according to the DVB-S specification.

For satellite connections the DVB standard [1] defines transmission system as depicted in FIG. 1. It adapts intra-service 108 and inter-service 112 multiplexed base band (including video 102, audio 104, and possibly data 106) signals to a satellite channel during a number of processing steps collectively named herein as a satellite channel adapter, see dotted line with reference sign 110. The source coding has been generally applied to said signals in accordance with reference [2].

The following processes are applied to the data stream:
transport multiplex adaptation and randomization for energy dispersal 114,
outer coding (i.e. Reed-Solomon block codes) 116,
convolutional interleaving 118,
inner coding (i.e. punctured convolutional code) 120,
baseband shaping for modulation 122, and
modulation 124.

Further details about DVB-S transmission can be found in reference [1] and cited publications therein.

Figure 2:
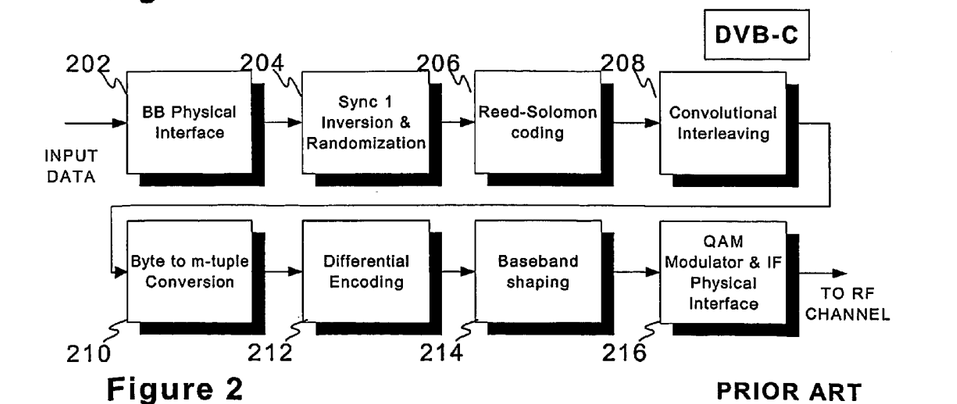
FIG. 2 depicts the DVB transmission system according to the DVB-C specification.

Respectively, considering cable transmission of digital video signals, document [3] describes DVB-C components and features thereof. FIG. 2 discloses main functional blocks of sending direction in a cable system. BB interface block 202 adapts the input signal to the MPEG-2 transport layer framing structure (fixed length packets) with sync bytes. During sync inversion and randomisation 204 so-called Sync 1 byte is inverted and the data stream is randomised to ensure a sufficient number of transitions to occur in the signal for easier synchronization etc. Thereafter the randomised transport packets are subjected to Reed-Solomon FEC (Forward-Error Correction) coding 206 to retrieve a codeword for error detection and correction. The error-protected transport packets are then interleaved with a convolutional interleaver 208, meanwhile the actual convolutional coding as in DVB-S is not utilized at all. In step 210 the interleaved bytes are transformed into QAM (Quadrature Amplitude Modulation) symbols (m-tuple) after which differential coding 212 is applied to a number of most significants bits (MSB) in each symbol. Baseband shaping 214 includes mapping of m-tuples to I and Q signals followed by square-root raised cosine type filtering. Final stage, QAM modulation 216 of the signal has 16, 32, 64, 128, or 256 points in the constellation diagram. The modulated signal is then emitted to the physical interface being a radio frequency cable channel in this case.

Figure 3:
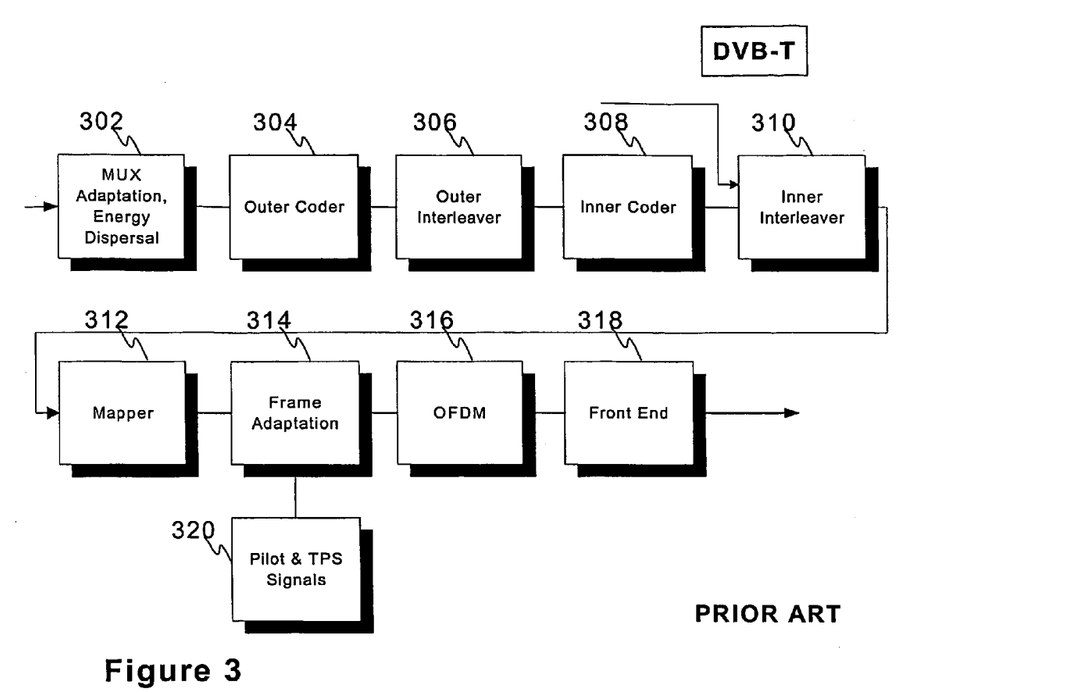
FIG. 3 depicts the DVB transmission system according to the DVB-T specification.

As a third alternative, FIG. 3 discloses an overview of the DVB-T system parts. Within MUX adaptation/Energy dispersal 302 block the signal is organized in packets (1 sync byte, 187 MPEG-2 data bytes) and randomised for energy dispersal. Next, outer coding block 304 includes Reed-Solomon coding of the input packets for error protection. Then, outer interleaving 306 is introduced to the error-protected packets. The interleaved data is then directed to a convolutional coder, inner coder 308 with several possible puncturing rates. Inner interleaving 310 phase includes both bit-wise and (OFDM) symbol-wise interleaving stages for input of one or two, see dotted arrow, bit streams. For further information refer to "hierarchical mode" in publication [4]. During mapping 312 the data stream is mapped to the constellation space. When frame adaptation 314 takes place, the signal is organized in frames of 68 OFDM symbols. In addition to data, the OFDM frames include pilot and TPS 320 (Transmission Parameter Signalling) signals for frame synchronization, channel estimation etc. Finally the signal is OFDM modulated 316 (with a plurality of carriers) and D/A converted to analogue form after which the analogue signal is driven out to the air interface through front end 318.

Due to the tremendous success encountered by the Internet during the 1990's an additional model for providing DVB services in this case over IP (Internet Protocol) networks has been recently created, see specification [5]. It obviously was a tempting idea to utilize already existing data networks for transferring also DVB data without further need to invest in new hardware etc. DVB services over IP have been described with reference to a common type layer model disclosed in FIG. 4. Dotted lines represent interfaces between different domains (horizontal separation) and layers (vertical separation). Darkened background element, management plane, can be used for general management and control purposes. Content provider is an entity or a number of entities providing the clients (subscribers) with the information flow, notice the elliptical patters for visualizing the flow, to be actually physically transferred by a service provider over a delivery network being transparent to the IP traffic. Tasks of the content provider may include, for example, authentication/authorization services, service portals maintenance, service offering, service discovery mechanisms, metadata services, actual content services etc. Respectively, service provider (e.g. ISP service provider) tasks may include addressing services, authentication/authorization services, naming services (DNS etc), basic IP connectivity service, session control means, service accounting, and a number of various value added services like firewalls, caches etc. It's completely possible though that the content and service aspects are in practise offered and technically implemented by a single entity only. Home domain is the domain where the DVB services are consumed. It may refer to one or more terminal devices in a single network or, alternatively, to a number of networks including a number of devices.

Figure 4:
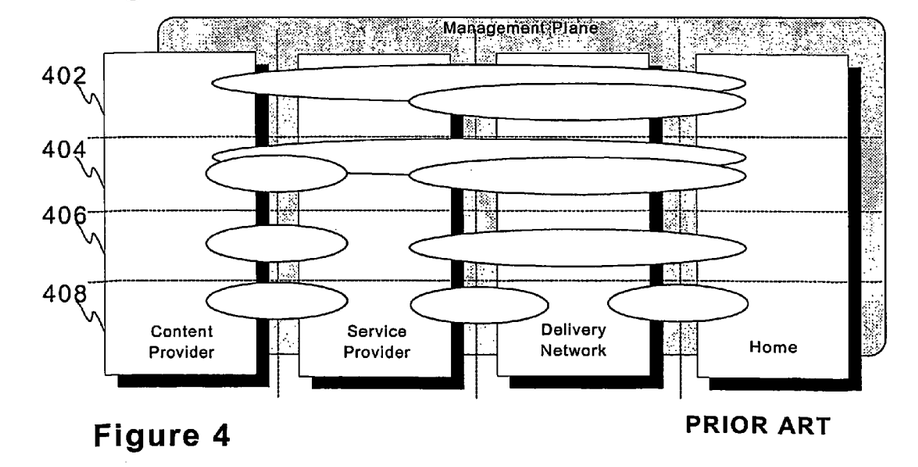
FIG. 4 illustrates the utilization of IP network as a delivery network of DVB service data.

As to the different layers of FIG. 4, physical layer 408 includes the lowest-level interfacing means to transfer data between the ends of a communications link. It determines e.g. connector shapes and sizes, "bit" definitions and synchronization aspects in relation to, for example, voltage levels and different time durations or other physical magnitudes. Reference numeral 408 also refers to link layer that handles media access control functions like addressing, and optionally error control, flow control, and re-transmission of defectively received data packets. Network layer 406 handles routing, packet segmentation/re-assembly etc functions relating to the whole end-to-end connection in question. In the case of IP networking such routing means addition of necessary IP addresses to sent packets. In principle, network layer 406 does not have to be aware of lower level physical/link 408 layers. Transport layer to which is likewise referred by collective reference sign 406 herein performs end-to-end type flow and error control functions and multiplexes a plurality of different services utilizing just a single IP link, for example. Multiplexing can be implemented by a plurality of different port numbers etc. Considering especially IP networks popular choices for a transport layer protocol are UDP (User Datagram Protocol) and TCP (Transmission Control Protocol) the latter of which provides also error detection/control on top of mere multiplexing. Session layer 404 sets-up and releases connections for applications' use. Application layer 402 includes applications and API(s) for interfacing them. In DVB context application layer 402 is specifically named as MHP (Multimedia Home Platform). Within the home domain IP traffic for DVB services can be carried over by utilizing, for example, common Ethernet (e.g. 100BASE-T) [6] or IEEE 1394 [7] physical/network layer technologies.

The DVB data encapsulated in IP packets can be either multicast or unicast to the subscribers depending on the service. For example, IP multicast can be used for PayTV type transfer and IP unicast for video/audio on demand type service. To retrieve more information about DVB in the context of IP networking, one shall revert to reference [5] and cited publications.

One of the most crucial decisions made at a time relates to the selected source coding method. MPEG-2 is a powerful aggregate of video and audio coding methods that utilize a number of different compaction techniques with remarkably high compression ratios with one major downside; the used compression methods are lossy, i.e. some data is irrevocably lost during the encoding process. Without such sacrifice the achievable compaction ratios (now typically from 1:6 to 1:30 etc) would not be near as impressive, as being obvious though. MPEG-2 coding also requires a considerable amount of processing, which, however, is generally not a problem with modern high performance processors anymore.

Figure 5:
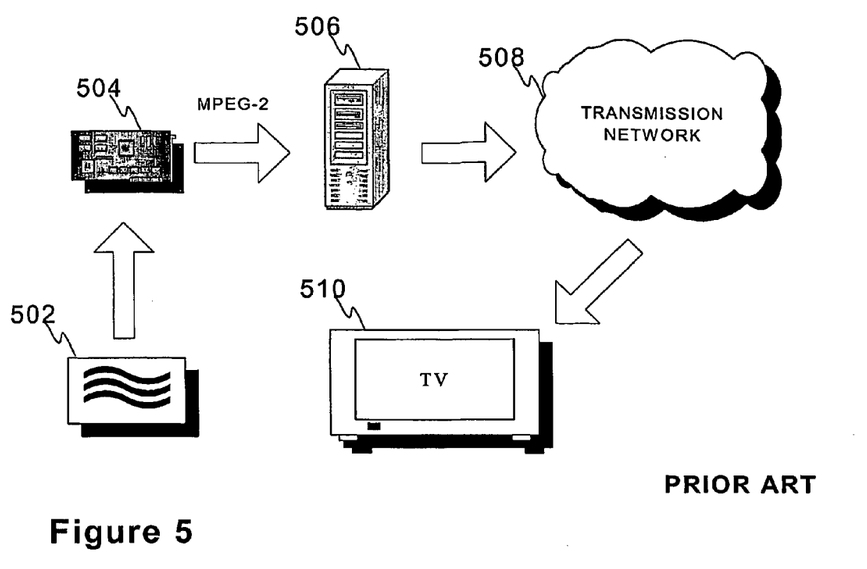
FIG. 5 depicts the typical MPEG-2 transmission system.

FIG. 5 discloses a generic process of encoding audio/video signal 502 with an MPEG-2 compliant encoder 504 producing standardized MPEG-2 stream as output. Audio/video server 506 receives and stores the encoded data stream, and eventually transmits it over transmission network 508 to receiver 510, e.g. a DVB set-top box connected to a television or a DVB IRD (Integrated Receiver Decoder) card installed therein, comprising necessary software/hardware means for decoding the stream for exploitation.

MPEG type coding shares some parts with a common still picture compression format JPEG that utilizes characteristics of human vision and extracts normally invisible and in that sense unnecessary information from a source picture during the encoding process. Encoding stage exploits e.g. Discrete Cosine Transform (time->frequency transformation) and entropy coding. High frequency changes in picture colour can be more easily omitted from the coded signal than high frequency luminance (brightness) changes to which the human eye is more sensitive. In addition to intra-frame (~intra-figure) aspects, MPEG exploits also temporal redundancy, i.e. static portions in consecutive video frames do not have to be coded for every frame; eventually, a content change within a certain area triggers sending of coded version thereof.

In MPEG, each pixel in a figure is parameterised with luminance/brightness value (Y) and two color vectors (U, V). Pixels are then grouped together to form blocks and groups of blocks called macro-blocks. Blocks shall be converted into frequency domain by utilizing DCT that is rather similar to a common Fourier transform. DCT results a number of coefficients describing the cosine functions formed from the block with increasing frequency. From such coefficients the spatial information carried by the blocks can be later resolved by the decoding unit. DCT transform output is then effectively quantized and Huffman coded. In Huffman encoding different symbols consume a variable number of bits. Frequently used symbols consume fewer bits and less frequently used symbols more bits.

Considering next some temporal aspects of MPEG coding, it's clear that in a video signal comprising a sequence of pictures referred to as frames hereinafter data contained in certain blocks may remain relatively unaltered for at least short period of time still extending to the duration of a plurality of subsequent frames. That certainly depends on the source signal characteristics; for example, news broadcast may include a clip wherein a newsreader sits with a desk and tells about what has been going on lately with the national economy. It's probable that the subsequent frames include changes between them mostly in the blocks near the narrator's facial area, meanwhile the background comprising a wall with paintings/posters etc stays unchanged; probably also camera movements are minimal in this kind of informative program. On the contrary, a fight scene in a modern action movie hardly contains any fixed portions between a larger number of subsequent frames to say at least.

Therefore, some blocks can be occasionally predicted on the basis of blocks in previous frames. Frames that contain these predicted blocks are called P-frames. However, to reduce the detrimental effect of transmission errors and to allow (re)-synchronization to the coded signal, also complete frames that do not rely on information from other frames are periodically transmitted (few times a second). These in many ways crucial stand-alone frames are named intra-coded or I-frames. I-frames are likewise needed, when a service subscriber starts receiving the service stream for a first time or at least after a pause, and the receiver thus lacks the necessary data history for constructing valid decoded frames on the basis of mere differential data, for example. Bi-directional frames utilizing information both from prior and following frames are called B-frames.

The above process is taken further by encoding motion vectors such that only portions of a picture that move or can be borrowed from other locations in previous frames of the video are encoded using fewer bits. Four 8×8 pixel blocks are grouped together into 16×16 macroblocks. Macroblocks that do not change are not re-encoded in subsequent frames. With P-frames, the encoder searches the previous frame (or frames before and after in case of B-frames) in half-pixel increments for other macroblock locations that are a close match to the information contained in the current macroblock. If no adequately matching macroblocks are found in the neighboring region, the macroblock is intra-coded and the DCT coefficients are fully encoded. If an adequate match is found in the search region, the full coefficients are not transmitted, but a motion vector is instead used to point to the similar block(s).

Figure 6:
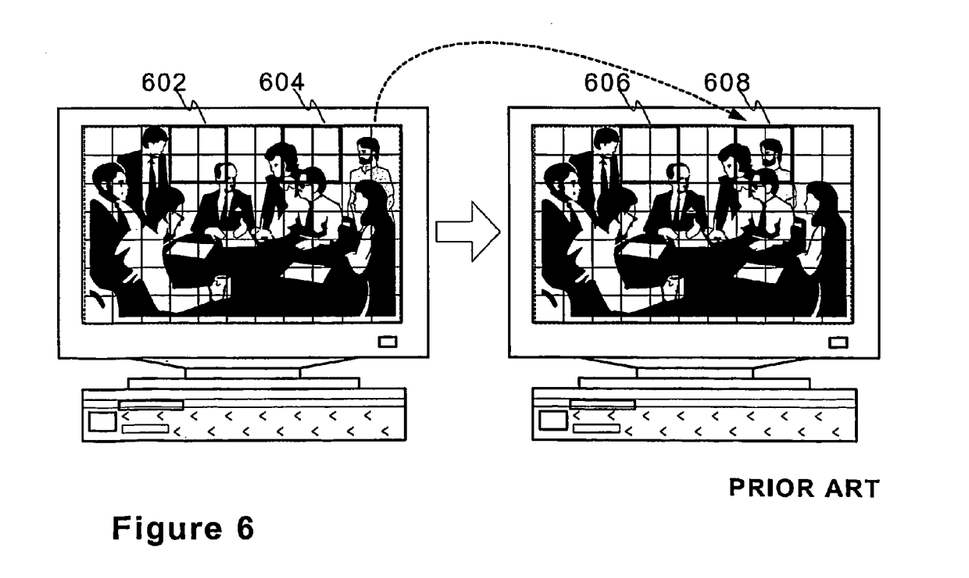
FIG. 6 illustrates both spatial and temporal aspects of MPEG-2 source coding.

Spatial and temporal sides of MPEG coding are depicted in FIG. 6 wherein two totally imaginary subsequent frames are coded in a computer equipped with an MPEG video encoder. Macroblocks 602 and 606 corresponding to a same location in the signal source contain practically identical data in both the frames and encoding thereof may thus be omitted (in P frames). Macroblocks 604 and 608, to the opposite, have a changing element, caused by a man walking by in otherwise static meeting scenario, and have to be re-encoded. However, as the encoding-causing element, the walking man, merely moves in the figure and its shape stays intact, motion vectors can be cleverly utilized in order to determine in the rightmost more recent frame a reasonable match with a macroblock in the previous frame on the left, see the dotted arrow highlighting this.

Respectively, MPEG audio coding utilizes certain distinct properties of human hearing like auditory masking effect. Both temporal and spatial (in frequency plane) aspects are considered with impressive 1:10 compression ratios achievable again with only minor, if any, degradations perceptible in the decoded signal. MPEG-2 has five channels for directional audio and a special low-frequency channel. Moreover, the encoded signal may also encompass a plurality of alternative language channels.

As the mammoth MPEG-2 standard includes a somewhat large number of different video and audio modes, the preferred level of adoption especially in case of DVB services is determined in reference [8] to facilitate the hardware manufacturers' tasks as to the compability issues inevitably rising in otherwise a bit too diverse context.

To provide the subscribers of DVB services with an option to really affect the service delivery (service subscription/selection, service parameters adjustment), a return channel for carrying out such tasks must be established. In DVB the interaction specifications have generally been split into two sets. One is network-independent and can be regarded as a protocol stack extending approximately via ISO/OSI layers two to three (see [9]) whereas the second group of DVB specifications relates to the lower layers (approximately one to two) of the ISO/OSI model and therefore specifies the network-dependent tools for interactivity. For example, the DVB Return Channel through Cable specification (DVB-RCC), see reference [10], is available for the purpose as well as the other specifications for fixed/cellular telephone interactivity and even satellite interactive systems. In case of IP networks, standard IP unicast can be used for interaction with a service/content provider. DVB Project web site http://www.dvb.org/ can be visited to find listings about available DVB related documentation.

Figure 7:
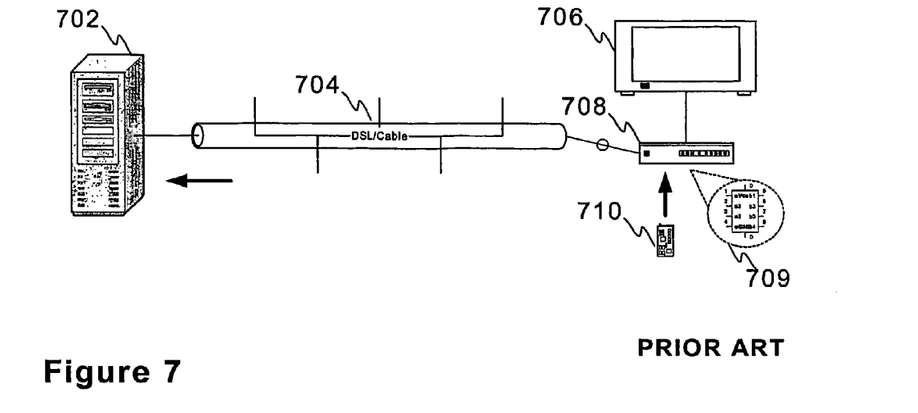
FIG. 7 depicts a service delivery over DSL/cable network to a DVB set-top box capable of providing the service data source with feedback/control information.

However, notwithstanding the various existing data transfer arrangements for delivering DVB service or control data, situations may still occur in which the currently available resources do not suffice for achieving acceptable transfer times. For example, services like real-time games require short response times for providing the subscriber with a reasonable gaming experience. A gaming scenario is depicted in FIG. 7 where service provider is game server 702 transmitting game information to one or more subscribers via a DSL or cable network 704 acting as a delivery network. At receiver side, set-top box 708 receives and decodes the service data at decoder 709 being, for example, a dedicated video processing chip or a more general processing device with multiple different tasks allocated thereto, and forwards it to TV receiver or monitor 706 for visualization. Remote control 710 may be used for controlling the local devices or sending service related control instructions/requests/feedback (notice the arrows) to server 702 over the aforesaid delivery network 704 or some other optional transfer path available for such purpose. The overall delay sensed by the subscriber while utilizing the service consists of a plurality of issues, few obvious ones of which to be issued being source data encoding time, transmission delay (may be asymmetric in relation to transfer directions depending on the used connection type), decoding delay, additional safety buffer delays, etc. As mentioned here inbefore, coded MPEG-2 stream typically includes a number of different frame types and the ones (1-frames) without differential nature naturally being larger in size than the predictive counterparts (P-frames).

Typically decoder chips 709 in set-top boxes configured to decode the received, still encoded video signal have been designed to work with source data stream of somewhat stable input rate. Accordingly, to guarantee reasonably flat input rate of source video stream for decoding in the presence of transmission errors and variable transmission delays, the received data is buffered before being forwarded to the actual decoder 709.

In most broadcast/multicast type services modest buffering is acceptable in contrast to certain interactive services like games, wherein any additional delay introduced to service data or feedback provision shall be deemed as disadvantageous irrespective of the begetter thereof. Response times should be nearly always minimized to offer the service user maximally transparent use experience regardless of the applied transmission technique. Thereby, reception side FIFO (First In First Out) buffers comprising e.g. one or more subsequent I or P frames in the case of MPEG-2 service data are on the other hand plainly problematic but then again necessary components in contemporary systems equipped with standard video decoding means. Besides, video decoder chips may not be able to handle the buffer underflow situations in which input data is not timely available, causing perceptible errors in the visualized decoded picture and delaying the proper decoding of subsequent frames until the next I-frame is received. Some decoder chips may not even be able to survive the data loss and continue normal functioning thereafter.

SUMMARY OF THE INVENTION

The object of the present invention is to alleviate the problems arisen in prior art solutions due to both unstable reception rate of encoded data and additional buffering introduced by it to the receiving devices to overcome the errors in decoding. The object is met by recognizing a forthcoming reception buffer underflow at a set-top box or other receiving device beforehand and supplying the decoder with a specific, preferably "no change" type (e.g. a predictive P-frame with suitable parameter values in the case of MPEG-2) and advantageously internally stored, frame that introduces no changes to a previous properly received and decoded frame whatever that generally was. Such a specific frame may be packed at the service provider or corresponding server with appropriate parameter values and transmitted once to the set-top box upon start-up of service data delivery, for example. The set-top box shall then store the frame for further use in future underflow occasions. Moreover, the set-top box may have to at least partially adapt the stored specific "no change" type frame to the prevailing situation, i.e. (re-)determine/tailor some parameter values of the frame to better fit in the current underlying service data stream. Nevertheless, e.g. in the case of MPEG-1 and MPEG-2 coding techniques the required adaptation is minimal and thus possible to perform in set-top boxes with only moderate processing capabilities.

The utility of the invention is grounded on many related issues. First, service data delivery delay is shortened as the size of the reception buffer can be minimized thanks to the detection and handling of imminent buffer underflow situations. Secondly, the no-change type special frames enable the decoder to continue with decoding process despite of occasional frame loss. Thirdly, the overall use experience is enhanced by minimizing the service response time and cutting down perceptible picture or other service data errors even if the reception buffers suffer from underflow. Still further, as the decoder does not temporarily stop functioning/decoding anymore due to the frame loss whenever the solution of the invention is applied therein, it is possible to extend the time period between the transmissions of subsequent I-frames to save transmission capacity.

Although the invention is described herein by referring to the provision of interactive services utilizing especially DVB technology/equipment, particularly DVB-C and DVB over IP, both with MPEG-2 source coding, also other digital broadband and/or broadcast systems with substantially similar characteristics may gain from using it. For example, coding methods like MPEG-1, MPEG-4, H.263 and H.264 utilize an I/P-frame concept more or less similar to the one of MPEG-2, and thus it's obvious to a person of average skill that the invention could be utilized in systems initially exploiting one of the above or corresponding coding methods. By terminal equipment it is referred to e.g. DVB IRD or "DVB set-top box" in more vernacular language. Data type refers to the nature of data, e.g. to video (picture) frame data or audio data.

In one aspect of the invention, a method for supplying a decoder with compressed service data transmitted over a delivery network towards the decoder residing at the receiving end, service data stream including both predictive and non-predictive data frames of a common data type, is characterized in that it has the steps of storing a certain specific frame or information thereof at the receiving end, monitoring at the receiving end whether a data buffer for service data is at least near an underflow condition according to a number of predetermined criteria, if that's the case, supplying the decoder with the specific frame, said specific frame being a predictive frame indicating substantially no changes in the service data in relation to a possible previous service data frame supplied, in order to prevent the decoder from being disturbed due to a lack of timely provided input data.

The specific frame in the above solution may be originally provided to the receiving device by the sender like a remote server or some middle-device e.g. at service data delivery initiation/start-up, periodically or upon some other predetermined event. The receiving device may send a request, a specific message or a parameter/parameter value in an existing message, to the sender to receive a new specific frame. Also the user of the device comprising the decoder may locally provide the specific frame either by manually typing in the necessary information for constructing one or by loading it from a carrier medium such as a floppy disc or a cd-rom.

The criteria for the underflow condition may be determined in a manner best suitable for the prevailing scenario. The criteria may state the minimum allowed duration left for the scheduled next supply of encoded service data to the decoder in the case of an empty input buffer, for example. If the specific frame is ready constructed and stored as is and needs no further adapting, the duration may be kept short, as feeding the decoder with the frame does not require much additional time consuming processing for adaptation, meanwhile heavier adaptation may take more time and the minimum allowed duration criterion shall be correspondingly longer in that case.

Data buffer comprises the necessary storage space to maintain information related to least one service data frame to be decoded and may be longer in a case-specific manner.

In another aspect of the invention, a method for transferring compressed service data to be transmitted over a delivery network towards the decoder residing at the receiving end, service data stream including both predictive and non-predictive data frames of a common data type, is characterized in that it has the step of monitoring an occurrence of a predetermined event, whereupon transmitting a certain specific frame or information thereof towards the receiving end in order to enable the receiving end to supply the decoder with said specific frame upon service data buffer underflow, said specific frame being a predictive frame indicating substantially no changes in the service data in relation to a previous service data frame.

The predetermined event may be service data delivery start-up/initiation, receipt of a frame request, expiration of a timer etc.

In a further aspect of the invention, a device capable of receiving service data sent by a data source over a delivery network and of transmitting data, service data stream including both predictive and non-predictive frames of a common data type, said device comprising processing and memory means for processing and storing instructions and data, is characterized in that it is configured to store a certain specific frame or information thereof at the receiving end, to monitor at the receiving end whether service data reception buffer is at least near an underflow condition according to a number of predetermined criteria, and if that's the case, to supply a decoder with the specific frame, said specific frame being a predictive frame indicating substantially no changes in the service data in relation to a possible previous service data frame supplied, in order to prevent the decoder from being disturbed due to a lack of timely provided input data.

Yet in a further aspect, a device capable of transmitting service data over a delivery network to terminal equipment and receiving control information sent by the terminal equipment related to said service, service data including both predictive and non-predictive data frames of a common data type, said device comprising processing and memory means for processing and storing instructions and data, is characterized in that it is configured to monitor an occurrence of a predetermined event, whereupon further configured to transmit a certain specific frame or information thereof towards the receiving end in order to enable the receiving end to supply a decoder with said specific frame upon service data buffer underflow, said specific frame being a predictive frame indicating substantially no changes in the service data in relation to a possible previous service data frame.

In the above devices, different functional blocks/modules can be either encased in a single housing or, alternatively, in a plurality of housings that are then at least functionally connected together to form a device of the invention.

Finally, a system capable of transferring service data over a delivery network, said service data including both predictive and non-predictive data frames of a common data type, said system comprising a first device capable of transmitting service data and receiving control information, and a second device capable of receiving service data and transmitting control information, said first and second devices both comprising processing and memory means for processing and storing instructions and data, is characterized in that said first device is configured to monitor an occurrence of a predetermined event, whereupon further configured to transmit a certain specific frame or information thereof towards the second device, said specific frame being a predictive frame indicating substantially no changes in the service data in relation to a possible previous service data frame, and said second device is configured to store said certain specific frame or information thereof, to monitor whether service data reception buffer is at least near an underflow condition according to a number of predetermined criteria, and if that's the case, to supply a decoder with the specific frame in order to prevent the decoder from being disturbed due to a lack of timely provided input data.

Various embodiments of the invention are disclosed in the dependent claims.

BRIEF DESCRIPTION OF THE DRAWINGS

Hereinafter the invention is described in more detail by reference to the attached drawings, wherein.

DETAILED DESCRIPTION OF THE EMBODIMENT OF THE INVENTION

FIGS. 1 through 7 were already introduced above in conjunction with the description of relevant prior art.

Figure 8:
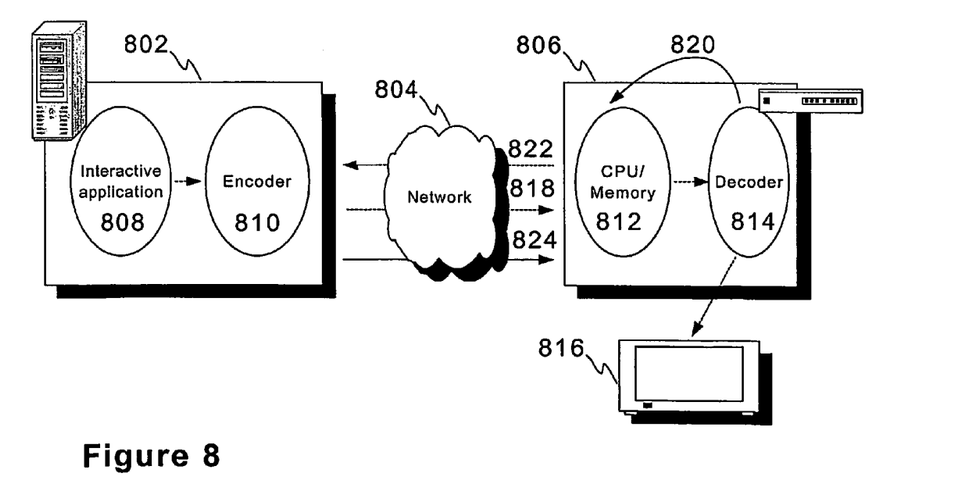
FIG. 8 discloses a scenario in which the locally stored predictive frame is utilized for filling in the gap between previously received and future data frames at the receiving set-top box.

FIG. 8 discloses a scenario for facilitating the further understanding of the solution of the invention in which either external or integrated set-top box 806 of television set 816 comprises analysis/processing means 812, software and/or hardware, for analysing a number of parameters relating to the incoming service data stream, see arrow 824, e.g. the status of input data buffer fill rate/degree. The buffer status may be checked by examining, for example, the current amount of data in the buffer, compared with a threshold value set for triggering the further execution of the method of the invention. If such threshold value is not met or exceeded, the buffer is deemed as underflown and the specific frame preferably locally stored in set-top box 806 shall be offered to decoder 814 to avoid possible malfunction therein due to missing data. Decoder 814 may provide means 812 with control or other information 820.

Server 802 coupled to the set-top box over network 804 comprises means, again software and/or hardware, for generating and transmitting specific "no change" type frames 818, e.g. specifically valued P-frames, to set-top box 806 e.g. upon receiving request 822 sent by set-top box 806, periodically, or upon initiation/start-up of service data delivery. In practise an occurrence of any sort of a predetermined event may be used to trigger the transmission of the specific frame. Interactive application 808 either resident in server 802 itself or at least connected thereto, provides the processing unit with service data to be encoded 810 and delivered 824 to set-top box 806. Correspondingly, also encoding of data may occur in an external coding device to which server 802 is connected.

Figure 9:
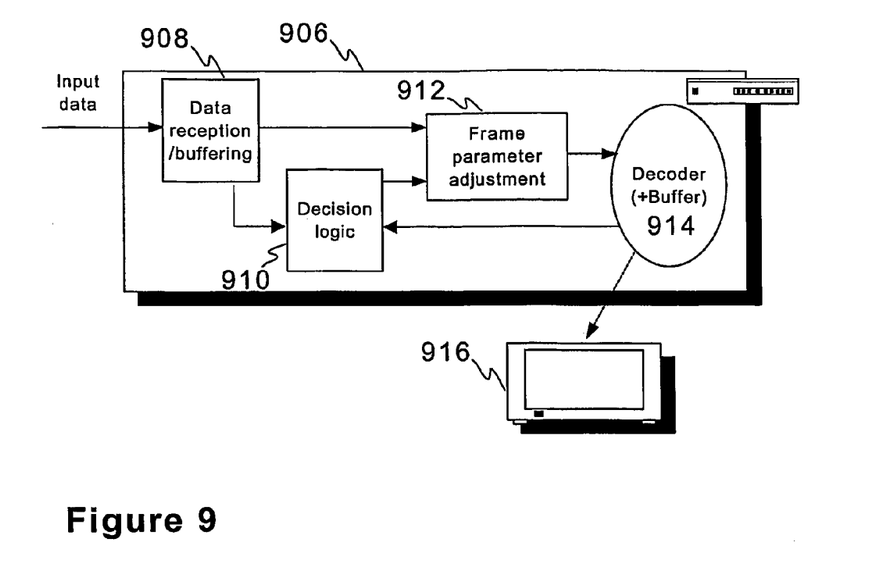
FIG. 9 discloses internals of the receiving set-top box when applying the method of the invention.

FIG. 9 represents the internal functional blocks of set-top box 906 associated with television set 916. Network data is received through an associated interface and inserted in a proper location in buffer 908. Data delivered over a network and relating to upper level services and applications is typically received as encapsulated into lower (network) level transmission packets and thus the insertion in buffer 908 may also include standard transmission packet decoding functionalities etc if the buffer is only dedicated to the structurally homogeneous service data to be decoded by decoder 914. Alternatively, data input buffer targeted solely for decoder 914 may be logically included in decoder block 914 itself whereas data reception 908 serves the receiving unit as a whole and includes also routing of received data for a plurality of other applications, for example. Decision logic 910, implemented e.g. through software application or programmable/application specific logic, keeps track of incoming data in generic and/or decoder-specific buffers by e.g. polling the buffers' status or by receiving corresponding status indications from data reception block 908 or decoder 914. Due to missing or defectively received data, decision logic 910 may then supply decoder 914 with an internally stored and specific "no change" type frame via frame parameter adjustment block 912. Frame parameter adjustment block 912 may set, for example, the time stamp and serial number of the service data frames.

Figure 10:
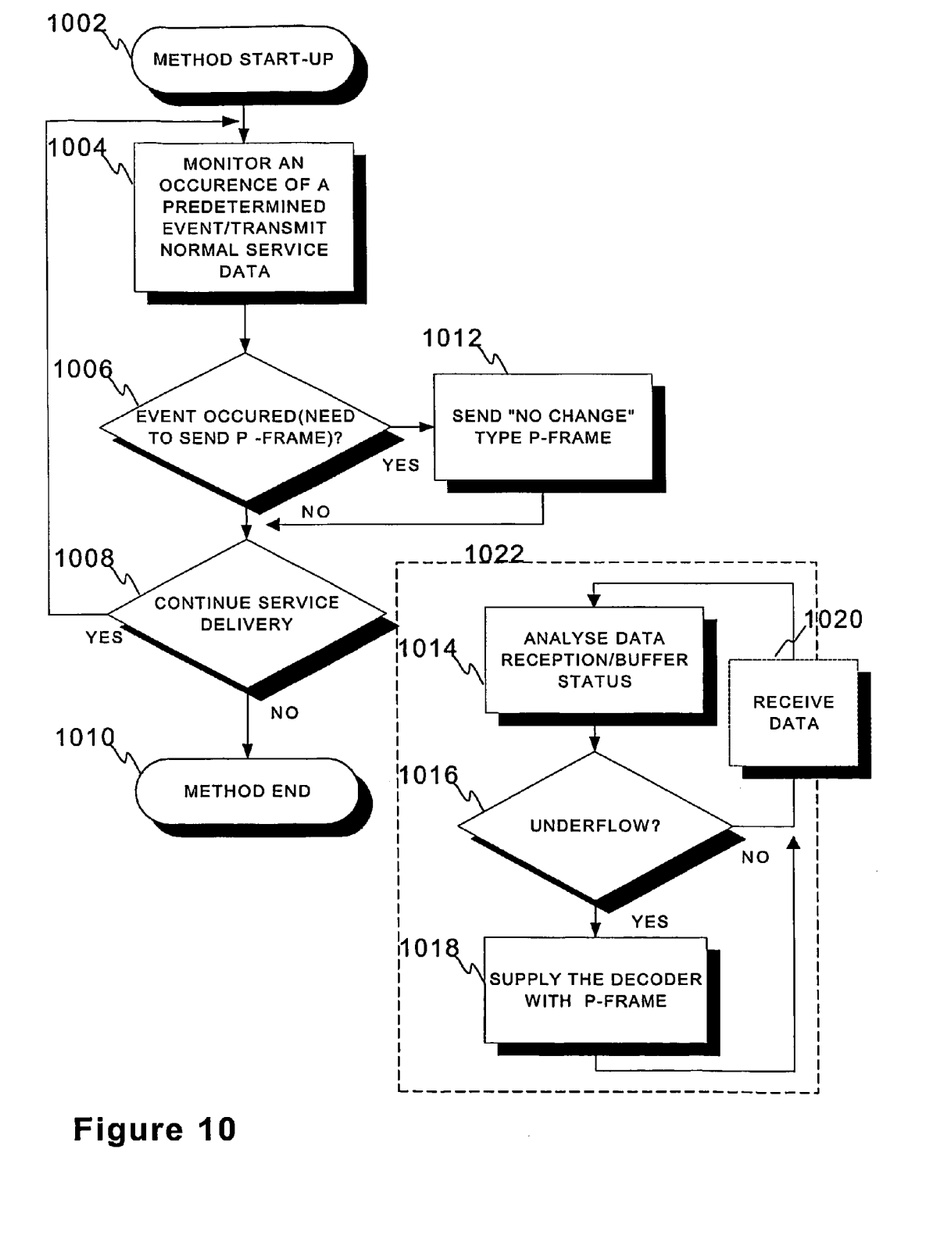
FIG. 10 discloses a flow chart of the method of the invention.

FIG. 10 discloses one option being an exemplary only of a flow diagram for carrying out the method steps of the invention. At method start-up 1002 a device such as the aforementioned server functioning as a data source loads encoding, data transfer, and general control applications to the memory thereof, initialises required memory areas and variables, establishes necessary connections on the basis of e.g. received service requests, and starts delivering the service data comprising encoded data frames. Likewise a receiving device such as a set-top box may execute the corresponding functions related to especially controlling and decoding of the service data to be received.

During phase 1004 the device transmits service data in ordinary manner and monitors whether an event triggering the transmission of a specific frame, e.g. a P-frame indicating no changes in data in relation to the previous frame, has occurred or not since the previous monitoring round. Monitoring may be periodic and performed only at predetermined intervals, for example, or continuous and executed alongside with other functions. After occurrence of such event like initiation of service data delivery 1006, the specific "no change" type P-frame or corresponding frame depending on the system is sent 1012. In step 1008 it is in any case checked whether service data delivery is to be continued, and if that's the case, method is restarted from step 1004. Otherwise, method is ended in step 1010.

The event is predetermined (events the occurrences of which are monitored could be stored in a list etc) in a sense that its occurrence can be recognized later during monitoring 1004 phase. Naturally the actual occurrences are not typically predetermined, as that would imply knowing the possible problem/error/service initiation or start-up situations beforehand.

Dotted line 1022 encircles method steps to be executed by a device at the receiving end such as a set-top box. Method initiation and termination steps are omitted in the figure for clarity reasons only. Data reception step 1020 is dotted although it certainly relates to the method of the invention but as also the lack/failure thereof may trigger the further method steps' execution, it's not an absolute condition as such for carrying out the rest of the steps as to be explained below. During data reception step 1020 both the normal service data frames and the specific "no change" type frames that are to be locally stored can be received.

Furthermore, only the necessary information related to the specific "no change" type frame, not necessarily the frame itself or all information therein, can be transmitted by the server and received by the set-top box. Then the set-top box shall construct the rest of the frame on the basis of the received information either in real-time upon desired use thereof or directly store it internally for possible future use. The information may comprise rules for constructing the whole frame or just some parameters that are attached to or used for tailoring the locally available core of a specific frame.

In step 1014 the device monitors whether the data buffer for decoding is near underflow condition according to a number of predetermined criteria such as threshold for the amount of data in the buffer, data reception rate, time elapsed since last frame (properly) received etc. Whenever such underflow criteria is met 1016, the decoder is supplied 1018 with the specific predictive frame such as a P-frame in the case of MPEG-2 coding with possibly dynamically adapted portions like certain parameters as described earlier in the text.

Figure 13:
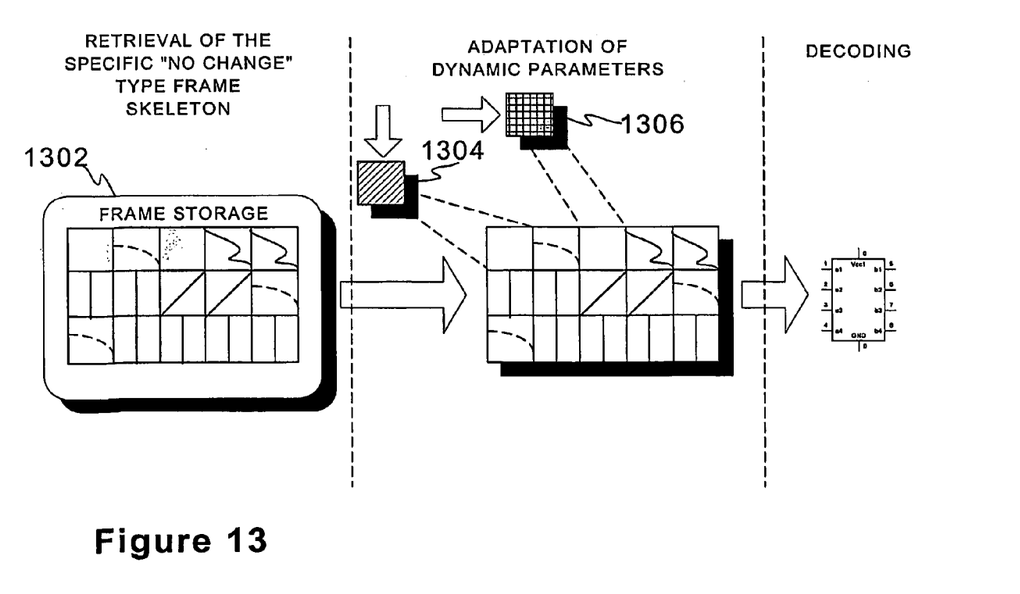
FIG. 13 illustrates the use of the stored predictive frame.

FIG. 13 further illustrates the use of the stored predictive frame. The specific "no change" type predictive frame in question has been stored in internal storage 1302 after receiving it from an external source like a service data server, or alternatively, the frame may have been (pre)-programmed earlier in the device or supplied thereto on a removable medium. Slots with different patterns depict various parameters and data fields of the frame. Upon detection of an occurrence of the triggering event, the frame is retrieved from the storage and dynamic parameters of it, if any, are adapted to fit in to the overall data stream, i.e. a normal service data frame that should have been properly received for decoding but still due for some reason is now emulated in a simple way to prevent the decoder from being disturbed by a data loss situation. In the figure parameters 1304 and 1306 are adapted on the basis of the current scenario. Depending on the associated interactive service the stored frame may be more of mere skeleton type with numerous locally adjustable parameters or in other extremity; the stored frame as such can be directly used for decoding without any adjustment. Nevertheless, the optionally adapted frame is finally forwarded for decoding.

Figure 11:
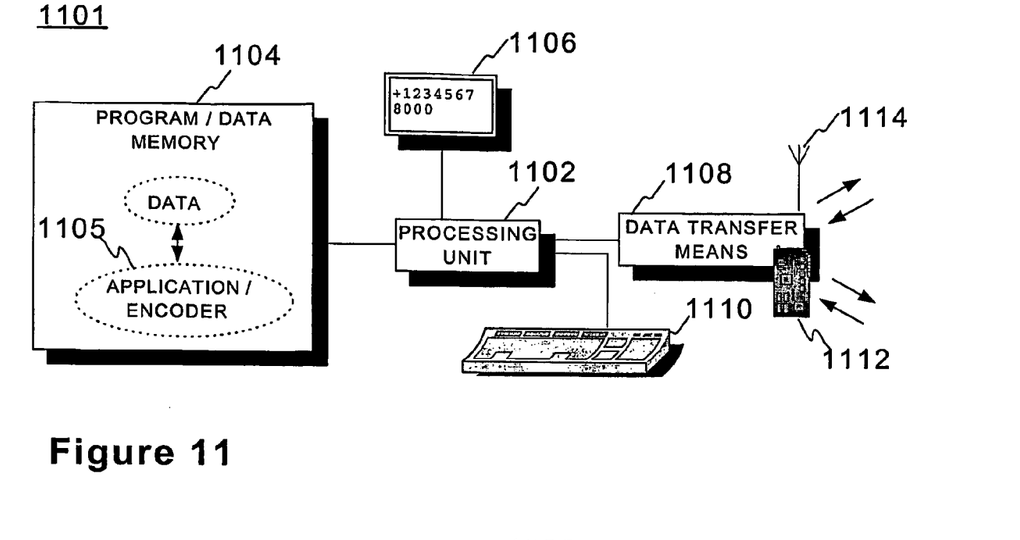
FIG. 11 is a block diagram of a device capable of acting as a service data source of the invention.

FIG. 11 discloses a block diagram of basic components for device 1101 such as a computer capable of acting as a server/data source for delivering encoded data with both predictive and non-predictive frames. Processing unit 1102 controls the execution of actions in accordance with instructions 1105 e.g. in a form of an application including data encoding routines stored in memory 1104. Memory 1104 may also comprise both un-coded and already encoded data frames in addition to required settings and other supplementary information. Data transfer means 1108 may include both wireless means 1114 like a radio/infrared transceiver and also wireless network (WLAN etc) adapters, or fixed means 1112 such as a conventional network adapter (Ethernet card etc), for example. Keyboard or other data input means 1110 and display 1106 are useful in providing a user with an interface for managing and controlling the device. Data encoder can be implemented through a specific encoder chip connected to the rest of the device in addition to mere software means.

Figure 12:
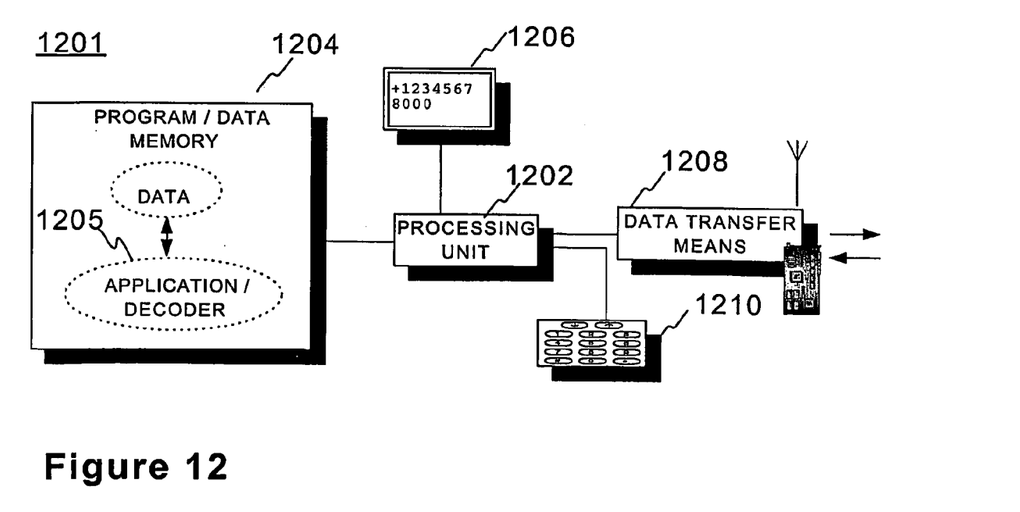
FIG. 12 is a block diagram of a device capable of acting as a service data recipient of the invention.

Likewise, device 1201 utilized in the invention for receiving encoded service data stream, a block diagram of which is shown in FIG. 12, comprises processing means 1202, memory means 1204 with decoder 1205, and data transfer means 1208 that may be wireless and/or fixed capable of connecting the device both to the delivery network and to the return channel, if different, to send control or other data towards the data source, for example. The device optionally comprises display 1206 in addition to keypad 1210 for implementing a sufficient UI. Data decoder 1205 can be implemented through a specific decoder chip connected to the rest of the device in addition to mere software means.

In general, the software for implementing the invention and method steps thereof can be delivered on a carrier medium such as a floppy, a CD-ROM, a memory card, a hard disk etc.

The protocols and protocol stacks utilized in service data transfer according to the invention can be selected from the existing ones as the transfer capabilities required for implementing the invention as such are not particularly complex or special, which can be seen as one benefit of the invention. The invention may be realized as an additional software/hardware module or a combination of both as included or at least connected to the device.

It should be obvious to a one skilled in the art that different modifications can be made to the present invention disclosed herein without diverging from the scope of the invention defined by the claims. Likewise, utilized devices, methods steps and their mutual ordering, data formats, etc may vary still converging to the basic idea of the invention.

REFERENCES

[1] ETSI EN 300 421 V.1.1.2 Digital Video Broadcasting (DVB); Framing Structure, channel coding and modulation 11/12 GHz satellite services
[2] ISO/IEC DIS 13818-1 (June 1994); Coding of moving pictures and associated audio (MPEG-2)
[3] ETSI EN 300 429 V1.2.1 Digital Video Broadcasting (DVB); Framing structure, channel coding and modulation for cable systems
[4] ETSI EN 300 744 V1.4.1 Digital Video Broadcasting (DVB); Framing structure, channel coding and modulation for digital terrestrial television
[5] ETSI TR 102 033 V1.1.1 Digital Video Broadcasting (DVB); Architectural framework for the delivery of DVB-services over IP-based networks
[6] ETSI TS 102 814 V1.2.1 Digital Video Broadcasting (DVB); Ethernet Home Network Segment
[7] ETSI TS 102 813 V1.1.1 Digital Video Broadcasting (DVB); IEEE 1394 Home Network Segment
[8] ETSI ETR 154 Digital Video Broadcasting (DVB); Implementation guidelines for the use of MPEG-2 Systems, Video and Audio in satellite, cable and terrestrial broadcasting applications
[9] prETS 300 802 Digital Video Broadcasting (DVB); Network-independent protocols for DVB interactive services
[10] ETSI ES 200 800 V1.3.1 Interaction channel for Cable TV distribution systems (CATV)

The invention claimed is:

1. A method for supplying a decoder, residing at terminal equipment, with compressed service data transmitted over a delivery network towards the decoder, the compressed service data comprised of a service data stream that includes both predictive and non-predictive data frames of a common data type, the method comprising:

pre-storing a specific frame or information sufficient for constructing the specific frame at the terminal equipment, wherein said specific frame or information is received from the delivery network from a server remote from the terminal equipment upon initiation of the service data delivery and stored as a pre-stored specific frame or information, said specific frame being a predictive frame indicating substantially no changes in the service data in relation to a possible previous service data frame supplied via the service data stream;

monitoring, at the terminal equipment, whether a data buffer for the service data is at least near an underflow condition according to one or more predetermined criteria; and upon a determination that the data buffer for service data is at least near the underflow condition, supplying the decoder with the pre-stored specific frame or information in order to prevent the decoder from being disturbed due to a lack of timely provided input data.

2. The method of claim 1, wherein said service data relate to at least one of following services: a digital broadband service, a digital broadcast service, and a DVB (Digital Video Broadcasting) service.

3. The method of any of claims 1-2, wherein said compressed service data includes video picture data.

4. The method of claim 3, wherein said video picture data is substantially MPEG-2 (Moving Picture Experts Group) coded.

5. The method of claim 4, wherein said specific frame is substantially a P-frame.

6. The method of claim 1, wherein said criteria includes at least one of i) an amount of data in a buffer, and ii) time left for a scheduled next supply of data to the decoder.

7. The method of claim 1, further comprising:
constructing, at the terminal equipment, the specific frame from said information.

8. The method of claim 1, wherein the specific frame is modified to fit in to an overall data stream.

9. The method of claim 8, wherein at least one of the following parameters included in the specific frame is modified: a time stamp, and a serial number.

10. A non-transitory computer-readable medium storing a computer program comprising code means sufficient to cause an information processing device to execute the method steps of claim 1.

11. A terminal device for receiving service data sent by a data source over a delivery network, the service data comprising a service data stream that includes both predictive and non-predictive frames of a common data type, said device comprising:

a decoder; and processing and memory means for processing and storing instructions and data including a service data reception buffer, said processing and memory means configured to i) pre-store a specific frame or information that enables the processing and memory means to construct the specific frame, and ii) monitor whether the service data reception buffer is at least near an underflow condition, wherein said specific frame or information is received via the delivery network from a server remote from the terminal device upon initiation of the service data delivery, wherein said specific frame is a predictive frame indicating substantially no changes in the service data in relation to a possible previous service data frame supplied via the service data stream, and wherein the processing and memory means is further configured to, upon a determination that the service data reception buffer is at least near the underflow condition supply the decoder with the pre-stored specific frame in order to prevent the decoder from being disturbed due to a lack of timely provided input data.

12. The device of claim 11, wherein said service data relate to at least one of following services: a digital broadband service, a digital broadcast service, and a DVB (Digital Video Broadcasting) service.

13. The device of any of claims 11-12, wherein said service data includes video picture data.

14. The device of claim 13, wherein said video picture data is substantially MPEG-2 (Moving Picture Experts Group) coded.

15. The device of claim 11 that is substantially at least one of the following: an IRD (Integrated Receiver Decoder), and a television set-top box.

16. The device of claim 11, wherein the processing and memory means is configured to determine whether the service data reception buffer is at least near an underflow condition based on at least one of the following: an amount of data in the buffer, and a time left fore a scheduled next supply of data to the decoder.

17. The device of claim 11, wherein said processing and memory means are configured to use said information to construct the specific frame.

18. The device of claim 11, wherein said processing and memory means are configured to modify the specific frame to fit in to an overall data stream.

19. The device of claim 18, wherein said processing and memory means are configured to adapt at least one of the following parameters into the specific frame: a time stamp, and a serial number.

20. The device of claim 11, wherein said processing and memory means are configured to send to said server a request for receiving the specific frame or the information.

21. A system for transferring compressed service data over a communications network, said compressed service data comprised of a service data stream that includes both predictive and non-predictive data frames of a common data type, comprising:

a terminal receiving device configured to connect to the communications network and to receive and process the compressed service data from the communications network, the terminal receiving device being comprised of an interface for connecting to and receiving the service data stream from the communications network, a service data buffer memory configured to buffer elements of the service data stream received from the communications network, a decoder configured to retrieve and decode the elements of the service data stream from the buffer memory, wherein the terminal receiving device is configured to receive, from the communications network, and store, in a pre-store memory of the terminal receiving device upon initiation of delivery of the service data stream over the communications network, a specific frame or information sufficient to cause the terminal receiving device to construct the specific frame, said specific frame being a predictive frame for indicating to the decoder substantially no changes in the service data with respect to a service data frame of the service data stream, and wherein the terminal receiving device is configured to monitor the buffer memory and determine whether the buffer memory is at risk of an underflow condition and, upon a positive detection that the buffer memory is at risk of the underflow condition, to provide the decoder with the specific frame or information thereby to enable continuous operation of a decoding process by the decoder.

22. The system as recited by claim 21, wherein the terminal receiving device is configured to construct, from the information received from the communications network, the specific frame to be provided to the decoder in the event of the positive detection that the buffer memory is at risk of the underflow condition.

23. The system as recited by claim 21, wherein the service data comprises any of a digital broadband service, a digital broadcast service, and a DVB (Digital Video Broadcasting) service.

24. The system as recited by claim 21, wherein the service data includes video picture data.

25. The system as recited by claim 24, wherein the video picture data is coded in accordance with the MPEG-2 standard.

26. The system as recited by claim 25, wherein the specific frame comprises a P-frame.

27. The system as recited by claim 21, wherein the terminal receiving device determines whether the buffer memory is at risk of an underflow condition by monitoring an amount of data in the buffer memory.

28. The system as recited by claim 21, wherein the terminal receiving device determines whether the buffer memory is at risk of an underflow condition by monitoring a time remaining for a scheduled next supply of data to be provided to the decoder from the service data stream.

29. The system as recited by claim 21, wherein the terminal receiving device is configured to modify the specific frame received from the communications network to include any of a time stamp and a serial number.

30. The system as recited by claim 21, further comprising:

a transmission device configured to connect to the communications network and to receive control information originating from the terminal receiving device, the transmission device configured to, upon receiving a control information from the terminal receiving device, transmit the specific frame or information to the terminal receiving device.

31. A non-transitory computer-readable medium storing a computer program comprising code means sufficient to cause an information processing device to operate as the terminal receiving device according to claim 21.

32. The system as recited by claim 21, further comprising:

a packet-switched communications network connected to said terminal receiving device, the terminal receiving device configured to retrieve the specific frame therefrom.

* * * * *